(12) United States Patent
Edwards

(10) Patent No.: US 8,884,583 B2
(45) Date of Patent: Nov. 11, 2014

(54) ACCESSORY OR FASHION ITEM THAT CHARGES VARIOUS ELECTRONIC DEVICES

(71) Applicant: emPowered LLC, New York, NY (US)

(72) Inventor: Loni Edwards, New York, NY (US)

(73) Assignee: emPowered LLC, New York, NY (US)

( * ) Notice: Subject to any disclaimer, the term of this patent is extended or adjusted under 35 U.S.C. 154(b) by 0 days.

(21) Appl. No.: 14/184,831

(22) Filed: Feb. 20, 2014

(65) Prior Publication Data

US 2014/0167679 A1 Jun. 19, 2014

Related U.S. Application Data

(60) Provisional application No. 61/921,225, filed on Dec. 27, 2013.

(51) Int. Cl.
*H01M 10/46* (2006.01)
*H02J 7/00* (2006.01)

(52) U.S. Cl.
CPC .............. *H02J 7/0044* (2013.01); *H02J 7/0054* (2013.01); *H02J 2007/0062* (2013.01)
USPC ........................................... 320/114; 150/131

(58) Field of Classification Search
CPC .......... H02J 7/35; H02J 7/0042; H02J 7/0045
USPC .......... 320/101, 107, 114, 115; 150/131, 133, 150/138
See application file for complete search history.

(56) References Cited

U.S. PATENT DOCUMENTS

| 2005/0140331 | A1 | 6/2005 | McQuade | |
|---|---|---|---|---|
| 2009/0218884 | A1* | 9/2009 | Soar | 307/11 |
| 2009/0224722 | A1 | 9/2009 | Causey | |
| 2010/0201312 | A1* | 8/2010 | Kirby et al. | 320/108 |
| 2012/0262116 | A1 | 10/2012 | Ferber et al. | |
| 2012/0262117 | A1* | 10/2012 | Ferber et al. | 320/111 |

OTHER PUBLICATIONS

BirkSun: Solar Backpacks—charge your passion, printed Mar. 19, 2014 from www.birksun.com (11 pages).
Everpurse—The Purse That Charges Your Smartphone, printed Mar. 19, 2014 from https://everpurse.com (5 pages).
Mighty Purse, printed Mar. 19, 2014 from www.mighty-purse.com (10 pages).
Phorce—The world's first smart bag, printed Mar. 19, 2014 from www.gephorce.com (5 pages).
Power Commute Laptop Messenger Bag, printed Mar. 19, 2014 from www.timbuk2.com/TB2/products/power-commute-tsa-laptop-sleeve-messenger-bag (3 pages).
Powerbag How It Works, printed Feb. 10, 2014 from www.mypowerbag.com/how-it-works (2 pages).
Solar Charger, Solar Backpack, Solar Laptop Charger, printed Mar. 19, 2014 from www.voltaicsystems.com (4 pages).
TYLT Energi Backpack—With Built-in Battery, printed Mar. 19, 2014 from www.tylt.com/energi-backpack (35 pages).
Urban Junket, printed Mar. 19, 2014 from www.urbanjunket.com/search?q=powered+laptop+bag&x=0&y=0 (12 pages).

* cited by examiner

*Primary Examiner* — Edward Tso
(74) *Attorney, Agent, or Firm* — Fox Rothschild LLP

(57) ABSTRACT

A toteable or wearable fashion item configured to provide an electronic charge to a mobile electronic device. The device includes a battery comprising one USB port and one pin port and a pouch secured to the fashion device and containing the battery substantially concealed therein, the pouch defining at least one opening which facilitates access to the USB port and the pin port.

10 Claims, 6 Drawing Sheets

ACCESSORY OR FASHION ITEM THAT CHARGES VARIOUS ELECTRONIC DEVICES

This application claims the benefit of U.S. Provisional Application No. 61/921,225, filed on Dec. 27, 2013, the contents of which are incorporated herein by reference.

FIELD OF THE INVENTION

This invention relates to a toteable or wearable fashion item which incorporates a battery for charging electronic devices wherein the battery is concealed but easily accessible.

BACKGROUND OF THE INVENTION

Mobile electronic devices have become part of the daily lives of people in our society. Having fully charged, functional electronic devices on one's person has become a necessity. Many people carry multiple devices daily, including mobile telephones, electronic readers, and tablet computers, among others. Devices often require charging during the day. In most cases, charging is accomplished by plugging a cord between the electronic device and a power outlet or a USB port on a computer. People on the go may not have access to an outlet or may not have time to wait at an outlet until the device charges. While some portable charging sources have been developed, they are often inconvenient and/or have a bulky, non-appealing look.

SUMMARY OF THE INVENTION

In at least one embodiment, the present invention provides a toteable or wearable fashion item configured to provide an electronic charge to a mobile electronic device. The device includes a battery comprising one USB port and one pin port and a pouch secured to the fashion device and containing the battery substantially concealed therein, the pouch defining at least one opening which facilitates access to the USB port and the pin port.

One embodiment of this system includes a handbag, a battery including at least one USB port and at least one pin port, and a universal connecting wire including a USB connector on one end and a pin connector on the other end. In the disclosed system, the universal connecting wire is capable of charging a variety of electronic devices without the need for multiple wires.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
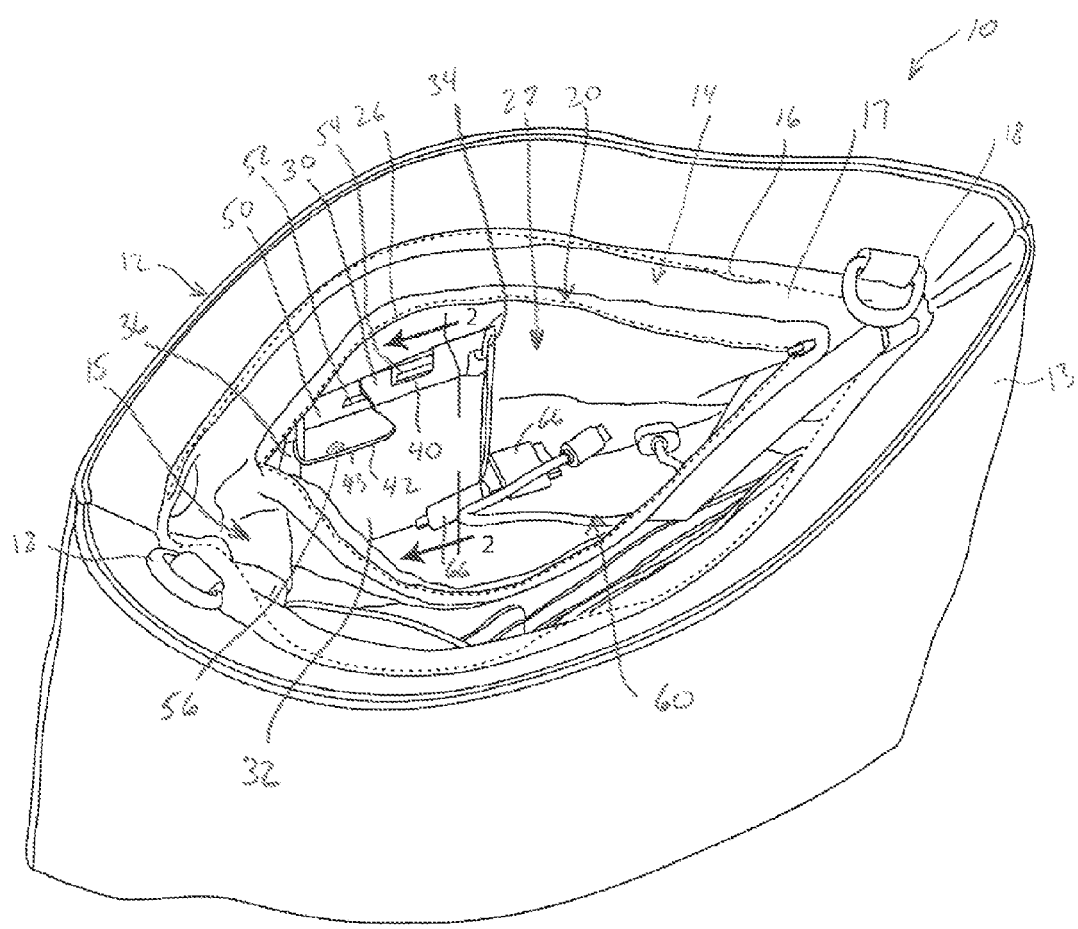
FIG. 1 is a perspective view of an exemplary handbag containing the battery and universal connecting wire and accessories in accordance with an embodiment of the invention.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-5, a toteable or wearable fashion item 10 in accordance with an exemplary embodiment of the invention will be described. In the illustrated embodiment, the fashion item 10 is in the form of a handbag, and more specifically a purse, however, the invention is not limited to such and may include various toteable or wearable items. For example, the fashion item 10 may include any bag or piece of luggage, including, but not limited to, handbags, shoulder bags, messenger bags, roller bags, garment bags, luggage, wallets, and camera bags. In another embodiment, the toteable or wearable fashion item includes, but is not limited to, pants, shorts, jackets, shirts, belts and any other wearable accessory or clothing item.

The exemplary fashion item 10 includes a body 12 having an outer shell 13 and an interior lining 17. The outer shell 13 is seemed along three sides and has an opening 14 along the other side which opens into a main interior chamber 15. A zipper 16 or the like may be provided to close the opening 14. Strap rings 18 are provided for connection of a strap (not shown). It is understood that the fashion item 10 may have other configurations.

Figure 4:
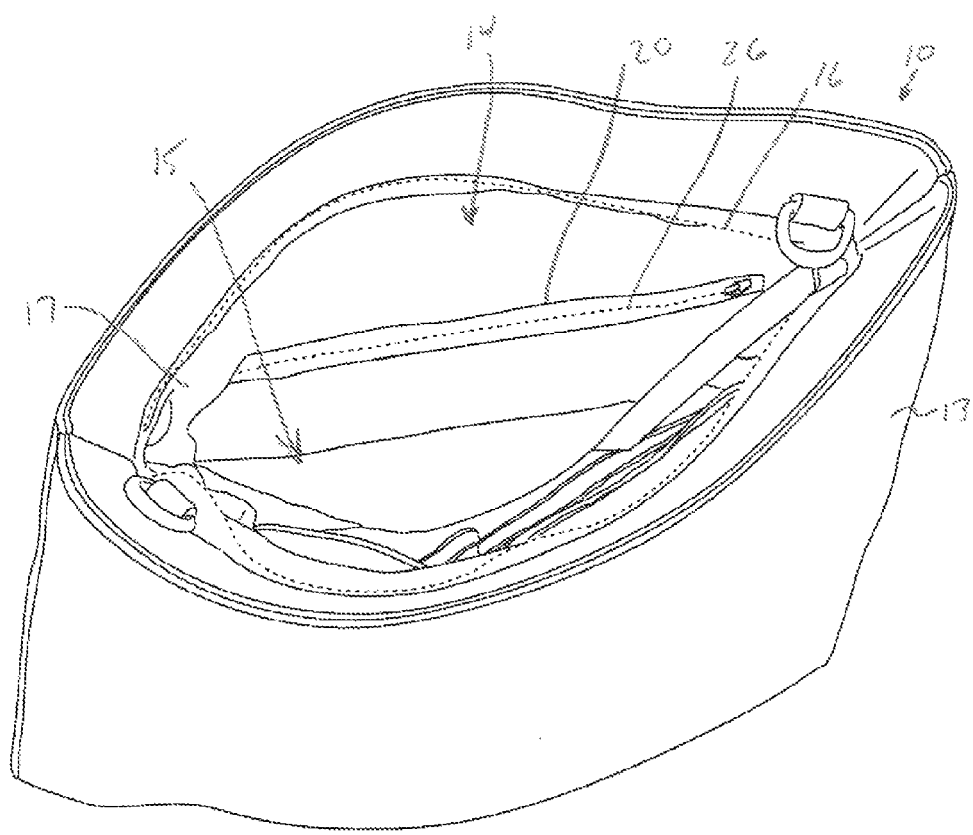
FIG. 4 is a perspective view similar to FIG. 1 illustrating the pocket which contains the battery and the connecting wire in a closed configuration.
Figure 5:
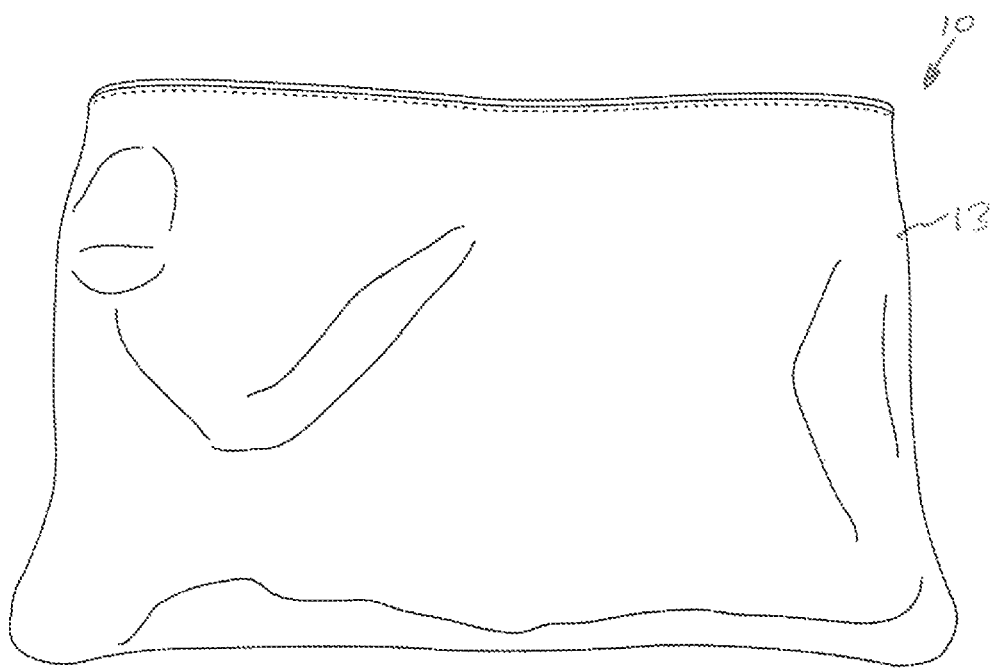
FIG. 5 is a side elevation view of the exterior of the handbag of FIG. 1.

Within the main interior chamber 15, a pocket 20 which defines a secondary chamber 22 is formed along one side of the main chamber 15. The pocket 20 is configured to house the battery 50, the universal connecting wire 60 and accessory connectors 66, if necessary. The pocket 20 may include a zipper 26 or the like to close the pocket 20, as illustrated in FIG. 4. With the pocket 20 closed, the battery 50 and other components are concealed while leaving room in the main interior chamber 15 for electronic devices and various other items. The interior main chamber 15 may also include various other securing and holding devices including, but not limited to, additional pockets, slots, and clips.

The fashion item 10 interior and exterior are preferably constructed of lightweight, high strength fabrics and materials. The fabrics and materials can be stain and tear resistant. The fashion item 10 can be constructed of soft and flexible materials, or solid and rigid materials. The fashion item 10 can also be constructed of soft and rigid materials. In one embodiment, the fashion item 10 is a handbag, the exterior shell 13 of which is made of leather and the interior lining 17 is made of nylon. Other materials that can be used for the exterior and/or interior of the fashion item 10 include, but are not limited to, natural fabrics, synthetic fabrics, rubber, recycled tires, polyurethane, and plastic.

Figure 2:
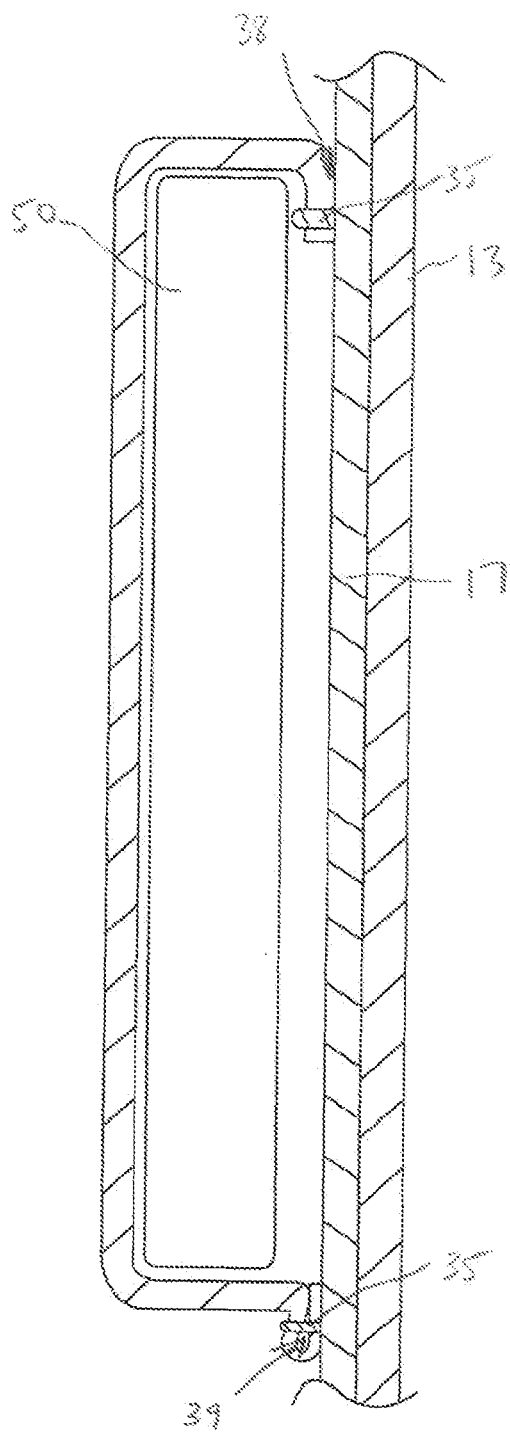
FIG. 2 is a cross-sectional view along the line 2-2 in FIG. 1.
Figure 3:
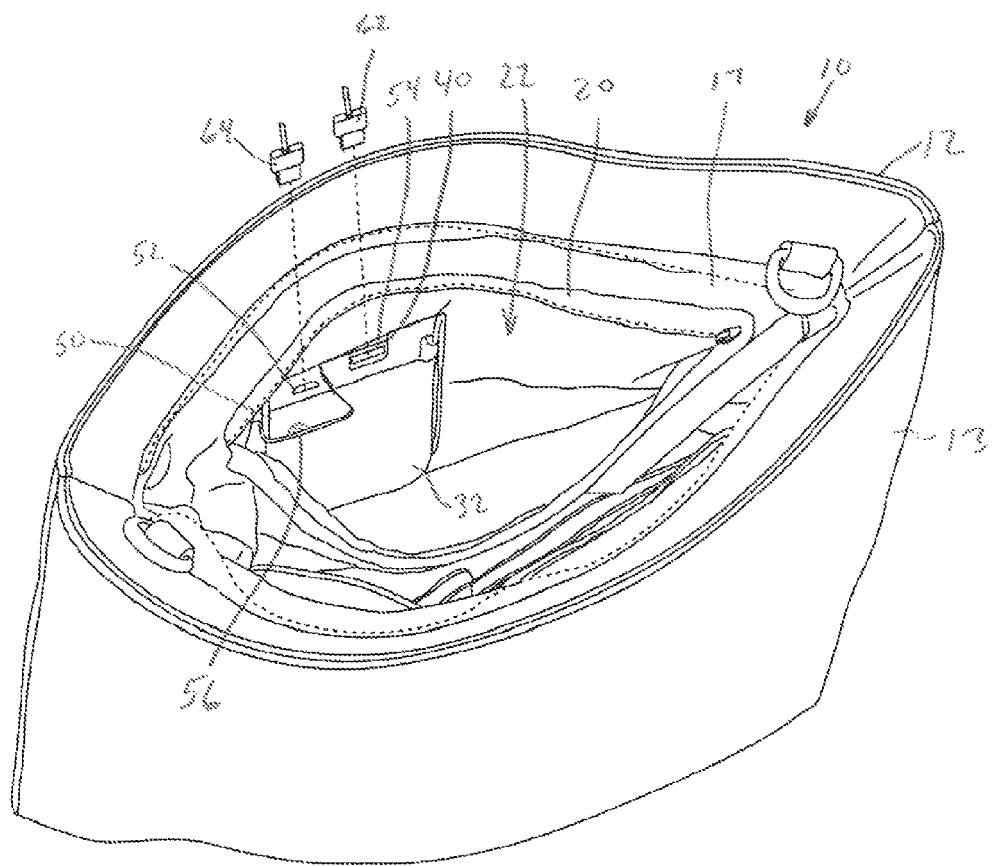
FIG. 3 is a perspective view similar to FIG. 1 illustrating connection of the connecting wire to the battery ports.

Referring to FIGS. 1-3, the battery 50 is held within a pouch 30 within the pocket 20. In the illustrated embodiment, the pouch 30 is formed by a single sheet of material 32 that is secured relative to the lining 17 along side seams 34 and 36 and along top and bottom seams 38 and 39. The seams 34, 36, 38 and 39 in the illustrated embodiment are formed via stitching 35, however, other seaming techniques may be utilized. Additionally, while all of the illustrated seams 34, 36, 38 and 39 are permanent seams, one of the seams, for example seam 38, may be formed as a releasable seam, for example using hook and loop fastener, to facilitate removal of the battery 50.

A first opening 42 is defined into the pouch 30 aligned with a first port 52 of the battery 50 and a second opening 40 is defined into the pouch 30 aligned with a second port 54 of the battery 50. In the illustrated embodiment, the first opening 42 has an extended area 43 which reveals an on/off switch 56 of the battery 50. While two separate openings 40, 42 are described, a single opening allowing access to both ports 52, 54 may be utilized. The continuous nature of the pouch 30 with the minimal openings 40 and 42 acts to conceal the battery 50 while still allowing easy access to the battery ports 52, 54, as illustrated in FIG. 3. It is further noted that in the present embodiment, the pouch 30 is free of cumbersome straps, flaps and the like which may interfere with access to the battery 50 or items within the pocket 20 and also which would take away from the aesthetic appearance of the fashion item 10. It is further noted with reference to FIG. 5 that none of the battery 50 or charging components extend to the outer shell 13 of the fashion item such that the aesthetic appearance of the fashion item 10 is not affected.

While the illustrated embodiment includes a pocket 20 in which the pouch 30 is positioned, it is recognized that the pocket 20 is not required. Instead, for example, the pouch 30 can simply be secured within the main chamber 15. In other embodiments wherein the fashion item 10 is other than a handbag, the pouch 30 may be secured as desired. For example, if the fashion item is a jacket, the pouch 30 may be secured within an interior pocket.

Figure 6:
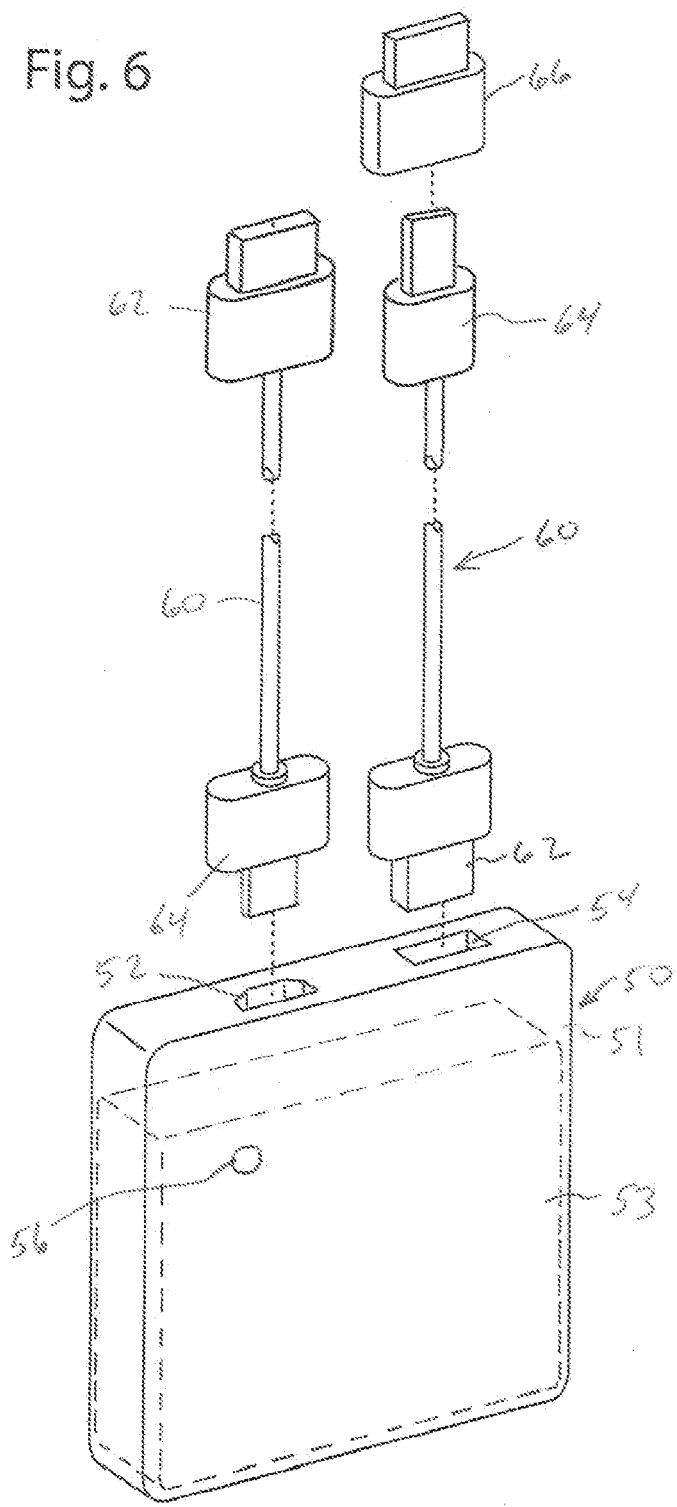
FIG. 6 is an exploded view of an exemplary battery and universal connecting wire in accordance with an embodiment of the invention.

Referring to FIGS. 3 and 6, an exemplary battery 50 will be described. The battery 50 includes a housing 51 with one or more interior battery cells 53. The battery 50 may be, for example, a lithium-ion battery, a nickel metal hydride battery or a nickel-cadmium battery. Other types of rechargeable batteries may also be utilized. Batteries with different storage capacities (e.g. amp hours) and/or different sizes may be used in connection with the disclosed invention. As the capacity of the battery increases, the thickness or length of the battery can increase. For example, the length, width, or depth of the battery may increase or decrease, depending upon the storage capacity of the battery. The configuration of the pouch 30 is preferably selected to complement the configuration of the battery 50.

The exemplary battery 50 has at least two ports, a USB port 54 and a pin port 52, defined into the housing 51 along with an on/off switch 56. In other embodiments, the battery 50 may have more than two ports and may also have differently configured ports, e.g. two USB ports. Additionally, the battery 50 may be configured such that an on/off switch 56 is not necessary. In the illustrated embodiment, the pin port 52 is an in-port, as the electric current flows from a charger or an electric outlet to the battery 50, transmitting a charge. The USB port 54 is an out-port, as the electric current flows from the battery 50 to the electronic device being charged.

With the described configuration, the battery 50 is charged by connecting the pin connector end 64 of the universal connecting wire 60 to the battery 50 and connecting the USB connector end 62 of the universal connecting wire 60 to a computer or car charger with a USB port for charging. The battery 50 can also be charged by plugging the pin connector end 64 of the universal wire 60 into the battery 50 and the USB connector end 62 into a plug adapter with a USB port (not shown), including, but not limited to, those that come with many mobile phones, electronic readers and tablet computers. The plug adapter is then in turn connected to any electrical outlet. The battery 50 can also be charged without using the universal connecting wire 60 or any adapters by utilizing any plug charger that can be connected to an electrical source and contains a connecting wire with a pin connector on the end that can be inserted into the battery's pin port 52. Once the battery 50 is charged, the battery 50 can be used to charge a variety of electronic devices. The universal connecting wire 60 allows the battery 50 to be recharged even when not at home or at the location of a dedicated docking station.

In the present disclosure, an electronic device includes, but is not limited to, a mobile phone, a handheld computer, a tablet computer, a personal digital assistant ("PDA"), a digital camera, a portable game machine, a portable music player, a portable media device, an electronic reader and/or a flashlight. A variety of types of mobile phones, electronic readers and tablet computers can be used in connection with the disclosed invention.

To charge an electronic device, the electronic device is connected to the universal connecting wire 60, which is connected to the battery 50 via the USB connector end 62. For electronic devices having a pin port, the pin connector end 64 can be inserted directly into the electronic device whereby charge will be delivered from the battery 50 to the electronic device. In the event the electronic device has a different type of port, an adapter 66 with a female pin port and a desired male port can be connected to the pin connector end 64, whereafter the electronic device will be charged by the battery 50. The universal connecting wire 60 is reversible in that the same wire can be used to allow for the charging of an electronic device, and the battery, as described above. This cuts down on bulk and increases the ease of use of the disclosed invention, in that it is not necessary to pack multiple cords to both charge and recharge a single electronic device.

The universal connecting wire 60 is preferably insulated and of a sufficient length to allow connection from the battery 50 to the electronic device and also to allow connection from the battery 50 to a power source for recharging of the battery 50.

It is contemplated that more than one electronic device can be charged at a given time within the fashion item 10 using power from the battery 50. For example, multiple electronic devices can be connected to the battery 50 using a multiple port adapter (not shown) connected to the pin connector end 64 of the universal connecting wire 60. Alternatively, the battery 50 may have multiple USB ports 54 which allow connection of multiple wires 60.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A toteable or wearable fashion item configured to provide an electronic charge to a mobile electronic device, comprising:

a battery housing enclosing at least one battery cell with a USB port extending into the battery housing and in communication with the battery cell and a pin port extending into the battery housing and in communication with the battery cell; and a pouch containing the battery housing substantially concealed therein, the pouch defining at least one opening which facilitates access to the USB port and the pin port, wherein the pouch is secured within a chamber of the fashion item wherein the chamber is without battery specific passages extending to an outside surface thereof such that the aesthetic appearance of the fashion item is not affected.

2. The toteable or wearable fashion item according to claim 1 wherein the fashion item is a bag defining a main interior chamber which defines the chamber within which the pouch is secured.

3. The toteable or wearable fashion item according to claim 1 wherein the fashion item is a bag defining a main interior chamber and a pocket within the main interior chamber defines the chamber within which the pouch is secured.

4. The toteable or wearable fashion item according to claim 3 wherein the pocket is sized to hold the battery and a universal connecting wire and one or more connecting wire adapters.

5. The toteable or wearable fashion item according to claim 3 wherein the pocket is closeable.

6. The toteable or wearable fashion item according to claim 1 further comprising a universal connecting wire including a USB connector on one end and a pin connector on the other end.

7. The toteable or wearable fashion item according to claim 6 further comprising at least one adapter having a female pin connector port and a male connector having a configuration other than a pin connector.

8. The toteable or wearable fashion item according to claim 6 further comprising at least one multiport adapter having a female pin connector port and two or more male connectors.

9. The toteable or wearable fashion item according to claim 1 wherein the fashion item is selected from one of a handbag, shoulder bag, messenger bag or wallet.

10. The toteable or wearable fashion item according to claim 1 wherein the at least one opening is aligned with the USB port and the pin port.

\* \* \* \* \*